US011422823B2

(12) United States Patent
Jin

(10) Patent No.: US 11,422,823 B2
(45) Date of Patent: Aug. 23, 2022

(54) STARTING METHOD FOR MULTI-MODE IOT DEVICE, MULTI-MODE IOT DEVICE, AND STORAGE MEDIUM

(71) Applicant: Telink Semiconductor (Shanghai) Co., Ltd., Shanghai (CN)

(72) Inventor: Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 268 days.

(21) Appl. No.: 16/763,980

(22) PCT Filed: Jun. 20, 2018

(86) PCT No.: PCT/CN2018/091935
§ 371 (c)(1),
(2) Date: May 13, 2020

(87) PCT Pub. No.: WO2019/100704
PCT Pub. Date: May 31, 2019

(65) Prior Publication Data
US 2020/0278871 A1  Sep. 3, 2020

(30) Foreign Application Priority Data

Nov. 27, 2017  (CN) .......................... 201711207438.7

(51) Int. Cl.
*G06F 9/4401* (2018.01)
*H04L 67/00* (2022.01)
(Continued)

(52) U.S. Cl.
CPC .............. *G06F 9/4401* (2013.01); *G06F 8/65* (2013.01); *H04L 67/34* (2013.01); *H04W 4/40* (2018.02);
(Continued)

(58) Field of Classification Search
None
See application file for complete search history.

(56) References Cited

U.S. PATENT DOCUMENTS

| 2015/0074386 A1 | 3/2015 | Huang et al. |
| 2017/0339640 A1 | 11/2017 | Krishnamoorthy et al. |
| 2020/0073452 A1* | 3/2020 | Isberg ..................... H04W 4/70 |

FOREIGN PATENT DOCUMENTS

| CN | 103902322 A | 7/2014 |
| CN | 106255955 A | 12/2016 |
| CN | 107911816 A | 4/2018 |

OTHER PUBLICATIONS

Int'l Search Report dated Aug. 29, 2018 in Int'l Application No. PCT/CN2018/091935.
(Continued)

*Primary Examiner* — Hong S Cho
(74) *Attorney, Agent, or Firm* — Panitch Schwarze Belisario & Nadel LLP

(57) ABSTRACT

A starting method for a multi-mode IoT device includes: receiving a starting operation aimed at a multi-mode IoT device; detecting partition starting flag bits in a memory in response to the starting operation, wherein the memory includes a plurality of first partitions that respectively store a communication mode starting code and include the partition starting flag bits, the partition starting flag bit indicates that a corresponding partition is a bootable partition when set to be effective, and the partition starting flag bit indicates that the corresponding partition is a non-bootable partition when set to be ineffective; and running the communication mode starting code in the first partition corresponding to the effective partition starting flag bit when the effective partition start flag bit is detected, so that the multi-mode IoT device works in a communication mode corresponding to the corresponding first partition.

11 Claims, 8 Drawing Sheets

(51) Int. Cl.
*H04W 88/06* (2009.01)
*H04W 4/40* (2018.01)
*G06F 8/65* (2018.01)
*H04W 8/24* (2009.01)
*G16Y 10/75* (2020.01)

(52) U.S. Cl.
CPC ............ *H04W 8/245* (2013.01); *G16Y 10/75* (2020.01); *H04W 88/06* (2013.01)

(56) References Cited

OTHER PUBLICATIONS

Smallest LTE Cat M1/NB1 Multimode Module for IoT and M2M Applications, Jul. 10, 2017, downloaded from web page: https://scigazette.com/2017/07/smallest-lte-cat-m1nb1-multimode-module-iot-m2m-applications/, Download date: Aug. 2018, original posting date:Jul. 10, 2017, 2 pages.
Extended European Search Report dated Dec. 22, 2020 in European Application No. 18880374.6.

* cited by examiner

STARTING METHOD FOR MULTI-MODE IOT DEVICE, MULTI-MODE IOT DEVICE, AND STORAGE MEDIUM

CROSS-REFERENCE TO RELATED APPLICATIONS

This application is a Section 371 of International Application No. PCT/CN2018/091935, filed Jun. 20, 2018, which was published in the Chinese language on May 31, 2019 under International Publication No. WO 2019/100704 A1, which claims priority under 35 U.S.C. § 119 to Chinese Patent Application No. 201711207438.7, filed on Nov. 27, 2017 the disclosures of all of which are incorporated herein by reference.

TECHNICAL FIELD

The present disclosure relates to multi-mode Internet of Things (IoT) technologies, and in particular, to a booting method for a multi-mode IoT device, a multi-mode IoT device and a computer storage medium.

BACKGROUND

At present, there exist a plurality of communication standards or communication modes applicable to 2.4 GHz IoT, for example, Bluetooth Low Energy (BLE), BLE Mesh (self-organizing network Bluetooth), Zigbee (Zigbee protocol), Thread and 6 LoWPAN, etc., and these communication modes are overlapped or interlaced in application fields of home environment, office environment and industrial environment, etc.

A multi-mode IoT RF System on Chip (IoT RF SoC) may be available in the current market from, for example, Telink Semiconductor (Shanghai) Co. Ltd. to enable a single device to work in different IoT communication modes. For example, an integrated circuit (IC) chip can be enabled to support different IoT communication modes simply by incorporating 2.4 GHz RF into the IC chip.

However, various different IoT communication modes are supported by the current multi-mode IoT device in such a manner that various different IoT communication modes run over one and the same firmware to share the software/hardware resources over one and the same firmware, thus there exists a problem that each IoT communication mode cannot fully occupy the software/hardware resources over one and the same firmware.

SUMMARY

The present disclosure can effectively realize the booting of a multi-mode IoT device based on specific storage area division, whereby all the software/hardware resources of the firmware are enabled to be used independently for the IoT communication mode running currently while the multi-mode IoT device is capable of supporting various IoT communication modes, thereby improving the communication response time of the IoT device and reducing the communication delay.

According to a first aspect of this disclosure, there provides a booting method for a multi-mode IoT device, which includes: receiving a booting operation for the multi-mode IoT device; checking at least one of segment boot flags in a storage of the multi-mode IoT device in response to the booting operation, wherein the storage includes a plurality of first segments, the plurality of first segments respectively having communication mode boot codes for respective communication modes stored therein and containing the segment boot flags, wherein each of the segment boot flags is configured to, when set to be valid, indicate that a corresponding first segment is a bootable segment, and when set to be invalid, indicate that the corresponding first segment is an unbootable segment; and running, when a valid segment boot flag is detected, a communication mode boot code in a first segment corresponding to the valid segment boot flag, to cause the multi-mode IoT device to work in a communication mode corresponding to the first segment.

According to one embodiment of this disclosure, the storage further includes a second segment for updating the communication mode boot codes, the second segment having a segment boot flag, and the method further includes: checking the segment boot flag of the second segment; and running a communication mode boot code in the second segment if it is detected that the segment boot flag of the second segment is valid, to cause the multi-mode IoT device to work in a communication mode corresponding to the second segment.

According to one embodiment of this disclosure, the method further includes: downloading an updated communication mode boot code corresponding to a current communication mode of the multi-mode IoT device into the second segment; and setting the segment boot flag of the second segment to be valid, and setting a segment boot flag of a first segment corresponding to the current communication mode to be invalid.

According to one embodiment of this disclosure, after causing the multi-mode IoT device to work in the communication mode corresponding to the second segment, the method further includes: copying the communication mode boot code in the second segment into a first segment that corresponds to the communication mode corresponding to the second segment; and setting the segment boot flag of the second segment to be invalid, and setting a segment boot flag in the first segment that corresponds to the communication mode corresponding to the second segment to be valid.

According to one embodiment of this disclosure, the communication mode includes at least two of: Bluetooth Low Energy (BLE) or BLE Mesh, Zigbee, Thread, HomeKit, ANT and a private communicate protocol.

According to a second aspect of this disclosure, there provides a multi-mode IoT device, which includes: a control unit; a storage including a plurality of first segments, wherein the plurality of first segments respectively have communication mode boot codes for respective communication modes stored therein and contain segment boot flags, each of the segment boot flags is configured to, when set to be valid, indicate that a corresponding segment is a bootable segment, and when set to be invalid, indicate that the corresponding segment is an unbootable segment; and an RF transceiving unit supporting various communication modes; wherein the control unit is configured to: check at least one of segment boot flags in the storage in response to a booting operation for the multi-mode IoT device; and run, when a valid segment boot flag is detected, a communication mode boot code in a first segment corresponding to the valid segment boot flag, to cause the RF transceiving unit to work in a communication mode corresponding to the first segment.

According to one embodiment of this disclosure, the storage further includes a second segment for updating the communication mode boot codes, the second segment having a segment boot flag, and the control unit is further configured to: check the segment boot flag of the second segment; and run a communication mode boot code in the second segment if it is detected that the segment boot flag of the second segment is valid, to cause the RF transceiving unit to work in a communication mode corresponding to the second segment.

According to one embodiment of this disclosure, the control unit is further configured to: download an updated communication mode boot code corresponding to a current communication mode of the RF transceiving unit into the second segment; and set the segment boot flag of the second segment to be valid, and set a segment boot flag of a first segment corresponding to the current communication mode to be invalid.

According to one embodiment of this disclosure, after causing the RF transceiving unit to work in the communication mode corresponding to the second segment, the control unit is further configured to: copy the communication mode boot code in the second segment into a first segment that corresponds to the communication mode corresponding to the second segment; and set the segment boot flag of the second segment to be invalid, and set a segment boot flag in the first segment that corresponds to the communication mode corresponding to the second segment to be valid.

According to a third aspect of this disclosure, there provides a multi-mode IoT device, which includes: one or more processors; a storage; and a computer program stored in the storage, wherein, when executed by the one or more processors, the computer program causes the one or more processors to implement a booting method according to any one of the embodiments in the above first aspect.

According to a fourth aspect of this disclosure, there provides a computer-readable storage medium, which has a computer program stored therein, wherein, when executed by a processor, the computer program causes the processor to implement a booting method according to any one of embodiments in the above first aspect.

With the teaching of this disclosure, it is possible to effectively realize, based on a specific storage area division, that a multi-mode IoT device runs a boot code of a specific communication mode in a desired storage area when booting, whereby all the software/hardware resources of the firmware are enabled to be used independently for the IoT communication mode running currently while the multi-mode IoT device is capable of supporting various IoT communication modes, thereby improving the communication response time of the IoT device and reducing the communicate delay, and thus improving the user experience of the multi-mode IoT device. Therefore, in this disclosure, by selecting one valid communication mode alternatively at the booting stage of the IoT device, the software/hardware resources of the firmware are enabled to be used independently for the communication mode.

It should be understood that, the teaching of this disclosure does not need to realize all the above beneficial effects, instead, a specific technical solution may realize a specific technical effect, and other embodiments of this disclosure can further realize some beneficial effects not mentioned above.

BRIEF DESCRIPTION OF THE DRAWINGS

The above and other objects, characteristics and advantages of exemplary embodiments of the disclosure will be easy to understand by reading the detailed description below with reference to the drawings. In the drawings, several embodiments of the disclosure are shown illustratively, rather than limitatively, wherein the same or the corresponding reference sign represents the same or the corresponding part.

DETAILED DESCRIPTION

The principles and concepts of the disclosure will be described below by referring to several exemplary embodiments. It should be understood that, these embodiments are only provided for one skilled in the art to better understand and thus implement the disclosure, rather than to limit the scope of the disclosure in any way. On the contrary, these embodiments are provided to make this disclosure more thorough and more complete and to more fully convey the scope of this disclosure to those skilled in the art.

Specific embodiments of the disclosure will be described in detail below in conjunction with the drawings.

Figure 1:
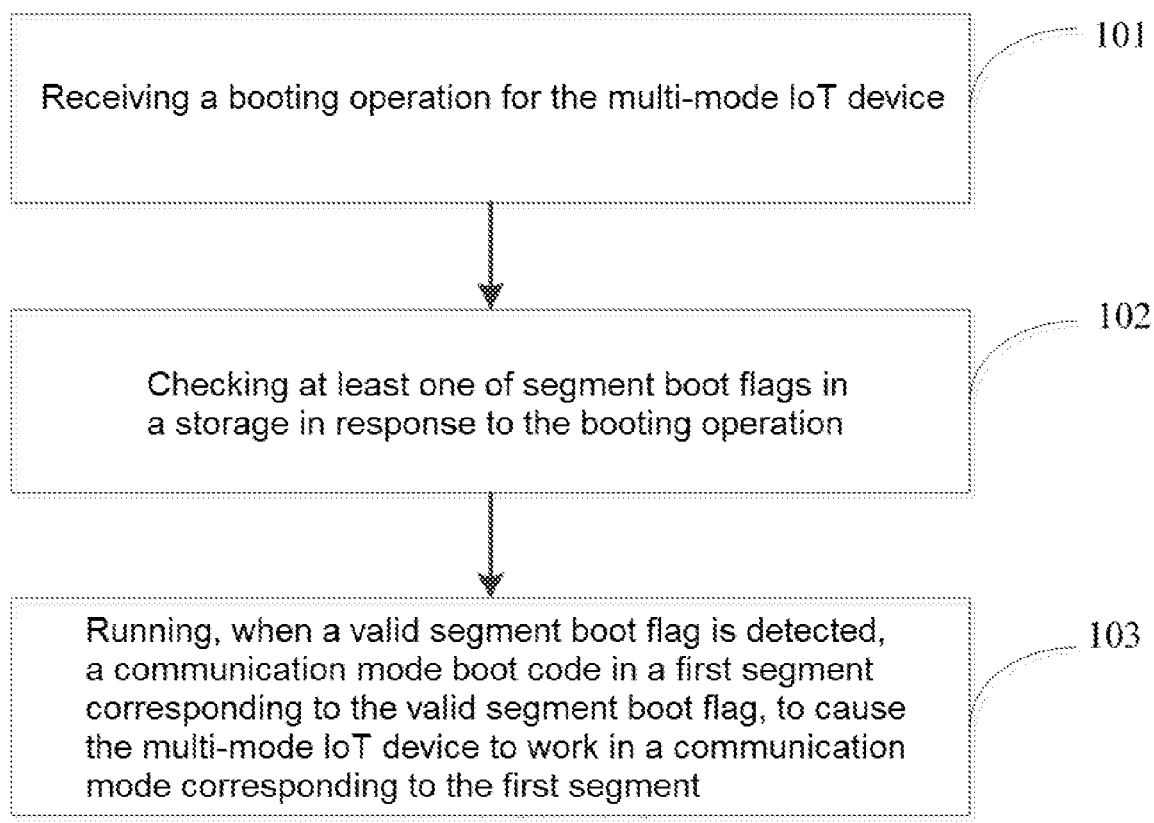
FIG. 1 shows a schematic flow chart for the implementation of a booting method for a multi-mode IoT device according to embodiments of the disclosure.

FIG. 1 shows a schematic flow chart for implementation of a booting method for a multi-mode IoT device according to embodiments of the disclosure.

As shown in FIG. 1, an embodiment of the disclosure provides a booting method for a multi-mode IoT device, which includes: Operation 101 of receiving a booting operation for the multi-mode IoT device; Operation 102 of checking at least one of segment boot flags in a storage of the multi-mode IoT device in response to the booting operation, wherein the storage includes a plurality of first segments, the plurality of first segments respectively having communication mode boot codes for respective communication modes stored therein and containing the segment boot flags, wherein each of the segment boot flags is configured to, when set to be valid, indicate that a corresponding segment is a bootable segment, and when set to be invalid, indicate that the corresponding segment is an unbootable segment; and Operation 103 of running, when a valid segment boot flag is detected, a communication mode boot code in a first segment corresponding to the valid segment boot flag, to cause the multi-mode IoT device to work in a communication mode corresponding to the first segment.

The communication mode may include at least two of: Bluetooth Low Energy (BLE) or BLE Mesh, Zigbee, Thread, HomeKit, ANT and a private communicate protocol.

In Operation 101, the booting operation for the multi-mode IoT device may include a poweron operation for the multi-mode IoT device; and the booting operation for the multi-mode IoT device may also include a reboot operation for the multi-mode IoT device.

In Operation 103, when a valid segment boot flag is detected, it indicates that the first segment corresponding to the valid segment boot flag is a bootable segment, thus the communication mode boot code in the first segment corresponding to the valid segment boot flag may be directly run to cause the multi-mode IoT device to work in the communication mode corresponding to the corresponding first segment.

In certain embodiments of the disclosure, before the booting of the multi-mode IoT device is implemented via Operations 101-103, it is desired to perform storage area division on the storage of the multi-mode IoT device in advance, the operation flow of which is as follows: in step 1, the storage space is divided to obtain N segments, N being greater than or equal to 3; in step 2, the N segments are functionally partitioned to obtain M segments that respectively contain segment boot flags and N-M user data segments, M being greater than or equal to 2 and less than N. In particular embodiments, each of the segment boot flags is configured to, when set to be valid, indicate that a corresponding segment is a bootable segment, and when set to be invalid, indicate that the corresponding segment is an unbootable segment.

In step 1, manners in which the storage space is divided mainly include a static division manner and a dynamic division manner, wherein, in the static division manner, storage area is divided with an interval of fixed bytes to obtain a plurality of segments; and in the dynamic division mode, storage area is divided dynamically in real time as required. It would be apparent that, the manner in which the storage space is divided may be selected also in dependence on the storage format of the storage itself.

In step 2, the M segments that respectively contain segment boot flags may be refined to a plurality of first segments which respectively have communication mode boot codes stored therein and at least one second segment for updating the communication mode boot codes, for example, on-the-air (OTA) segment.

Figure 2:
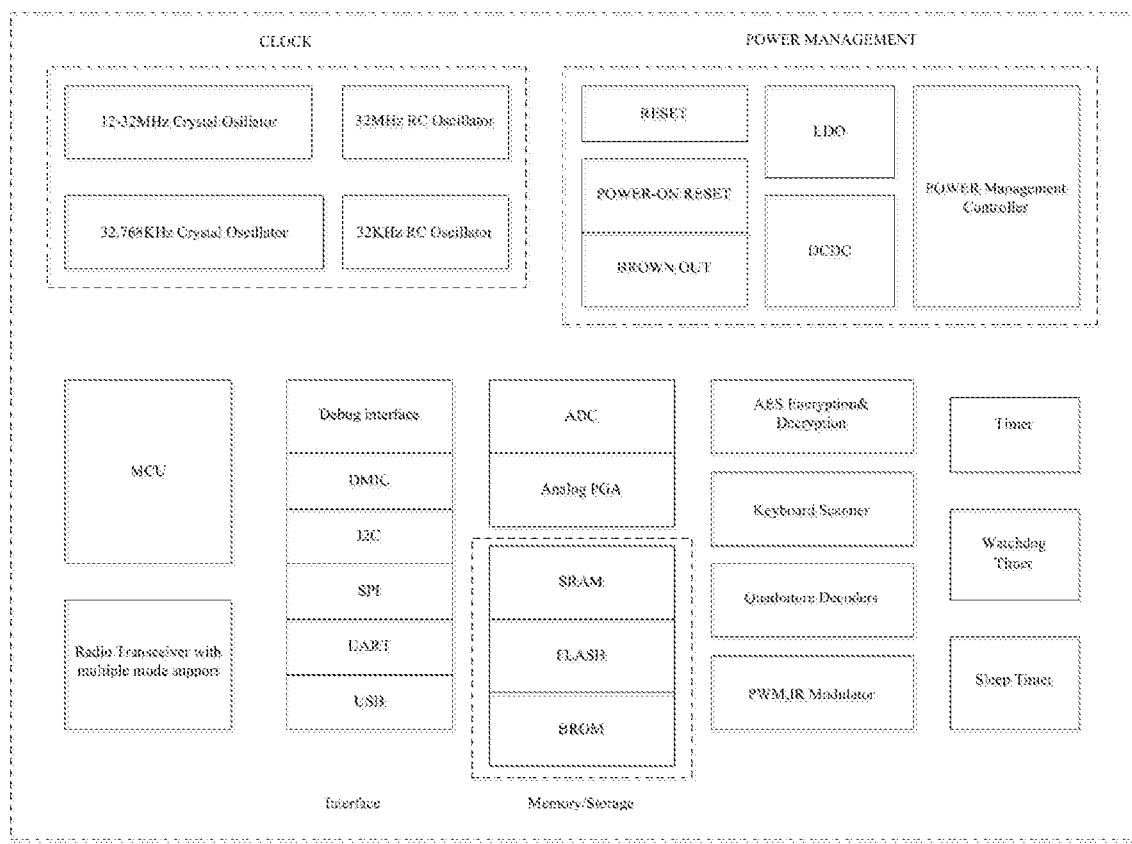
FIG. 2 shows a system architecture diagram of a multi-mode IoT RF SoC according to embodiments of the disclosure.
Figure 3:
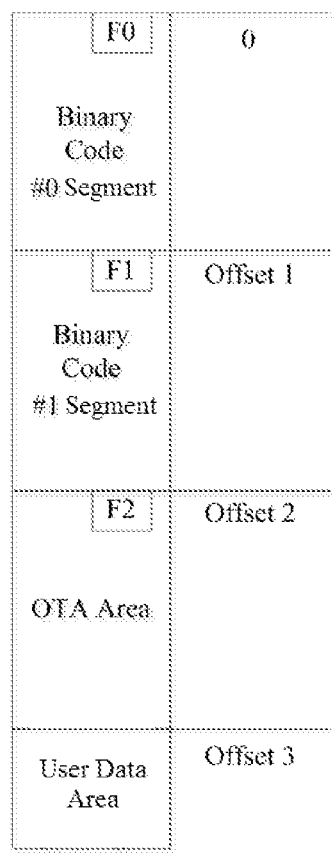
FIG. 3 shows a storage space layout diagram of a multi-mode IoT device according to embodiments of the disclosure.

FIG. 2 shows a system architecture diagram of a multi-mode IoT RF SoC according to embodiments of the disclosure; and FIG. 3 shows a storage space layout diagram of a multi-mode IoT device according to embodiments of the disclosure.

In one example, as shown in FIG. 2, the multi-mode IoT RF SoC includes a RF Transceiver capable of supporting different IoT communication standards, a 32-bit or higher-performance microcontrol unit (MCU) and a storage space of different formats, such as Flash and Boot ROM (BROM), etc. As shown in FIG. 3, the Flash or the storage space of other formats as shown in FIG. 2 may be divided into four segments with an interval of, for example, 64K, 128K and 256K bytes; further, the four segments are functionally portioned to obtain a segment reserved for user data, that is, a user data segment (User Data Area) and three segments respectively having segment boot flags F0, F1 and F2. Particularly as shown in FIG. 3, the #0 segment which has a binary code stored therein and the #1 segment which has a binary code stored therein are the first segments which respectively have communication mode boot codes stored therein, and the OTA segment is the second segment (i.e., shared area) for updating the communication mode boot codes, such that, when code in any first segment is desired to be updated, it may be updated via the shared area. Here, if it is desired to set the segment boot flag to be valid so as to cause the corresponding segment to be available for booting, the value of the segment boot flag may be set to be "1"; on the contrary, if it is desired to set the segment boot flag to be invalid so as to cause the corresponding segment to be unavailable for booting, the value of the segment boot flag may be set to be "0". For example, if F0=0, F1=1, F2=0, . . . , it may be determined that the #1 segment is a bootable segment.

Figure 4:
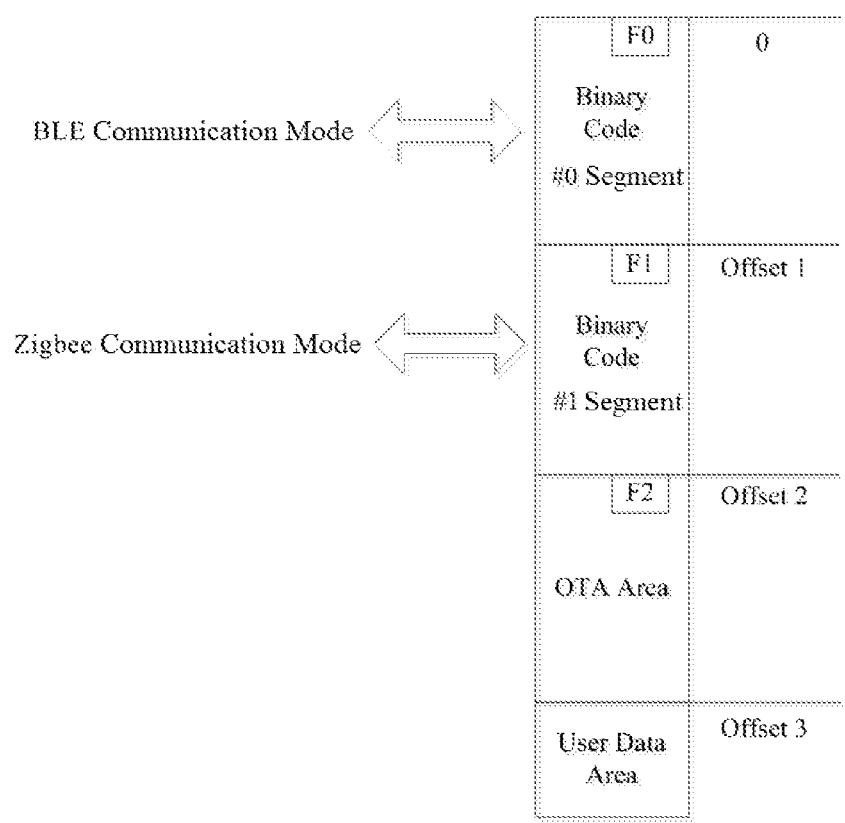
FIG. 4 shows a storage space layout diagram of a multi-mode IoT device according to embodiments of the disclosure.

FIG. 4 shows a storage space layout diagram of a multi-mode IoT device according to embodiments of the disclosure.

In one example, as shown in FIG. 4, the first segments #0 and #1 respectively correspond to BLE communication mode and Zigbee communication mode. For example, in the case that F0=0, F1=1, F2=0, . . . , it could be detected that F1=1, that is, it could be determined that the corresponding first segment #1 is a bootable segment, in other words, the multi-mode IoT device will run the Zigbee boot code stored in the first segment #1 when booting so as to work in the Zigbee communication mode. In another example, in the case that F0=1, F1=x, F2=x, . . . , it could be detected that F0=1, that is, it could be determined that the corresponding first segment #0 is a bootable segment, in other words, the multi-mode IoT device will run the BLE boot code stored in the first segment #0 when booting so as to work in the BLE communication mode.

According to further embodiments of the disclosure, based on the storage space layout of the multi-mode IoT device as shown in FIG. 3, the method may further include: checking a segment boot flag of the second segment; and running a communication mode boot code in the second segment if it is detected that the segment boot flag of the second segment is valid, to cause the multi-mode IoT device to work in a communication mode corresponding to the second segment.

According to still further embodiments of the disclosure, the method further includes: downloading an updated communication mode boot code corresponding to a current communication mode of the multi-mode IoT device into the second segment; and setting the segment boot flag of the second segment to be valid, and setting a segment boot flag of a first segment corresponding to the current communication mode to be invalid. In the embodiment shown in FIG. 3, the OTA segment is the second segment. Thus, when the multi-mode IoT device is rebooted, it would be detected that the segment boot flag of the second segment is valid, so that the updated communication mode boot code in the second segment would be run, whereby the multi-mode IoT device achieves to run the updated communication mode boot code. Here, the second segment may be shared among the first segments, that is, the communication mode boot code in any first segment may be updated via the second segment. Such an update manner is further advantageous in that: during downloading the updated communication mode boot code into the second segment, the running of the current communication mode of the multi-mode IoT device will not be affected.

Figure 5:
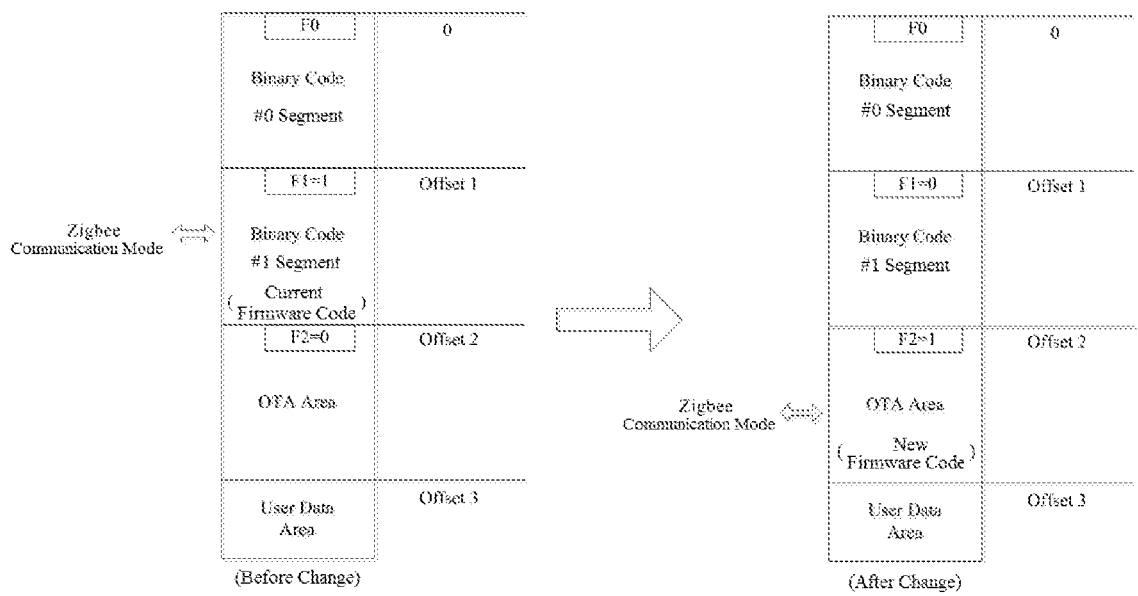
FIG. 5 shows a storage space layout change diagram of a multi-mode IoT device according to embodiments of the disclosure.

FIG. 5 shows a storage space layout change diagram of a multi-mode IoT device according to embodiments of the disclosure.

In one example, as shown in FIG. 5, it is assumed that the multi-mode IoT device is currently running in the Zigbee communication mode (i.e., the current communication mode) in the #1 segment (i.e., the first segment), while the current firmware code corresponding to the Zigbee communication mode needs to be upgraded. In this regard, the multi-mode IoT device may first perform wireless communication with an upgrade device so that the IoT device downloads the updated firmware code (i.e., the updated communication mode boot code of the communication mode or the firmware code containing the updated communication mode boot code) into the OTA segment (i.e., the second segment). Particularly, after the multi-mode IoT device downloads the complete updated firmware code, it first performs integrity check and authentication on the updated firmware code and stores the updated firmware code into the OTA segment only after the integrity check and authentication are passed; then, the multi-mode IoT device sets the segment boot flag of the #1 segment to be invalid, that is, sets F1 as "0", and sets the segment boot flag of the OTA segment to be valid, that is, sets F2 as "1"; and finally, the updated firmware code downloaded into the OTA segment may be run by rebooting the multi-mode IoT device, so as to cause the multi-mode IoT device to work in the Zigbee communication mode corresponding to the updated firmware code.

According to still further embodiments of the disclosure, after the multi-mode IoT device is caused to work in the communication mode corresponding to the second segment, the method further includes: copying the communication mode boot code in the second segment into a first segment that corresponds to the communication mode corresponding to the second segment, and setting the segment boot flag of the second segment to be invalid, and setting a segment boot flag in the first segment that corresponds to the communication mode corresponding to the second segment to be valid. Thus, after the multi-mode IoT device is rebooted, it will boot from the first segment which has the updated communication mode boot code stored therein, so as to run the communication mode via the updated communication mode boot code.

Figure 6:
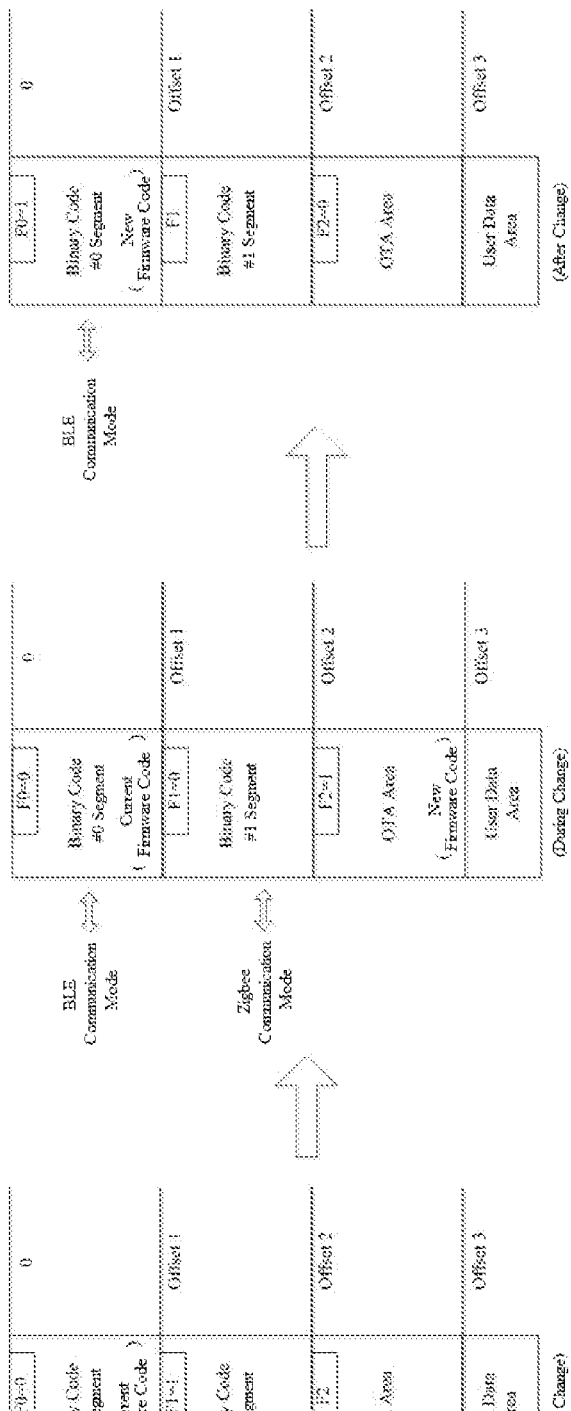
FIG. 6 shows a storage space layout change diagram of a multi-mode IoT device according to embodiments of the disclosure.

FIG. 6 shows a storage space layout change diagram of a multi-mode IoT device according to embodiments of the disclosure.

In one example, as shown in FIG. 6, it is assumed that the multi-mode IoT device runs in the Zigbee communication mode (i.e., the current communication mode), and the segment boot flag of its corresponding #1 segment (i.e., the first segment) is valid, that is, F1 is set to be "1", and currently it is desired to upgrade the current firmware code of the #0 segment (i.e., the first segment) corresponding to the BLE communication mode. First, the multi-mode IoT device performs wireless communication with an upgrade device so that the IoT device downloads the new firmware code into the OTA segment (i.e., the second segment). Particularly, after the multi-mode IoT device downloads the complete new firmware code, it first performs integrity check and authentication on the firmware code, which is followed by storing the new firmware code into the OTA segment; then, the multi-mode IoT device sets the segment boot flag of the #1 segment under running to be invalid, that is, sets F1 as "0", and sets the segment boot flag of the OTA segment to be valid, that is, sets F2 as 1; next, the multi-mode IoT device is rebooted after waiting a specific period of time or immediately, so that the multi-mode IoT device is triggered to run the new firmware code that has been download into the OTA segment, so as to cause the multi-mode IoT device to work in the BLE communication mode corresponding to the new firmware code; and finally, the multi-mode IoT device copies the new firmware code from the OTA segment into the segment corresponding to the BLE communication mode, i.e., #0 segment, and at the same time, the multi-mode IoT device sets the segment boot flag of the OTA segment to be invalid, i.e., sets F2 as "0", and sets the segment boot flag of the #0 segment in which code update is completed to be valid, i.e., sets F0 as "1", thus, when the multi-mode IoT device is rebooted, it can boot the updated BLE communication mode boot code from the #0 segment.

In a variation of the above example, it is assumed that the multi-mode IoT device runs in the Zigbee communication mode (i.e., the current communication mode), the segment boot flag of the #1 segment (i.e., the first segment) corresponding to which is valid, that is, F1 is set to be "1", and currently it is desired to upgrade the current firmware code of the #1 segment (i.e., the first segment) corresponding to the Zigbee communication mode. First, the multi-mode IoT device performs wireless communication with an upgrade device so that the multi-mode IoT device downloads the new firmware code into the OTA segment (i.e., the second segment). Particularly, after the multi-mode IoT device downloads the complete new firmware code, it first performs integrity check and authentication on, which is followed by storing the new firmware code into the OTA segment; then, the multi-mode IoT device sets the segment boot flag of the #1 segment under running to be invalid, that is, sets F1 as "0", and sets the segment boot flag of the OTA segment to be valid, that is, sets F2 as "1"; next, the multi-mode IoT device is rebooted after waiting a specific period of time or immediately, so that the multi-mode IoT device is triggered to run the new firmware code that has been download into the OTA segment, so as to cause the multi-mode IoT device to work in the Zigbee communication mode corresponding to the new firmware code; and finally, the multi-mode IoT device copies the new firmware code from the OTA segment into the segment corresponding to the Zigbee communication mode, i.e., #1 segment, and at the same time, the multi-mode IoT device sets the segment boot flag of the OTA segment to be invalid, i.e., sets F2 as "0", and sets the segment boot flag of the #1 segment in which code update is completed to be valid, i.e., sets F1 as "1", thus, when the multi-mode IoT device is rebooted, it can boot the updated Zigbee communication mode boot code from the #1 segment.

In this way, in the embodiment of the disclosure, it is possible to effectively realize, based on a specific storage area division, that a multi-mode IoT device runs a boot code of a specific communication mode in a desired storage area when booting, and the hardware resource utilization ratio of an IoT device in each communication mode supported by the IoT device may be improved while the multi-mode IoT device is capable of supporting various IoT communication modes, whereby the network delay due to hardware resource limitation of the IoT device may be effectively lowered, thereby improving the user experience of the IoT device. Additionally, in the embodiment of the disclosure, the update and upgrade of the communication mode boot code can be realized with the aid of a common OTA segment, and the communication mode boot code stored in the first segment will not be replaced before the communication mode boot code is updated and upgraded, thus a safer and more reliable updating and upgrading process can be realized.

Figure 7:
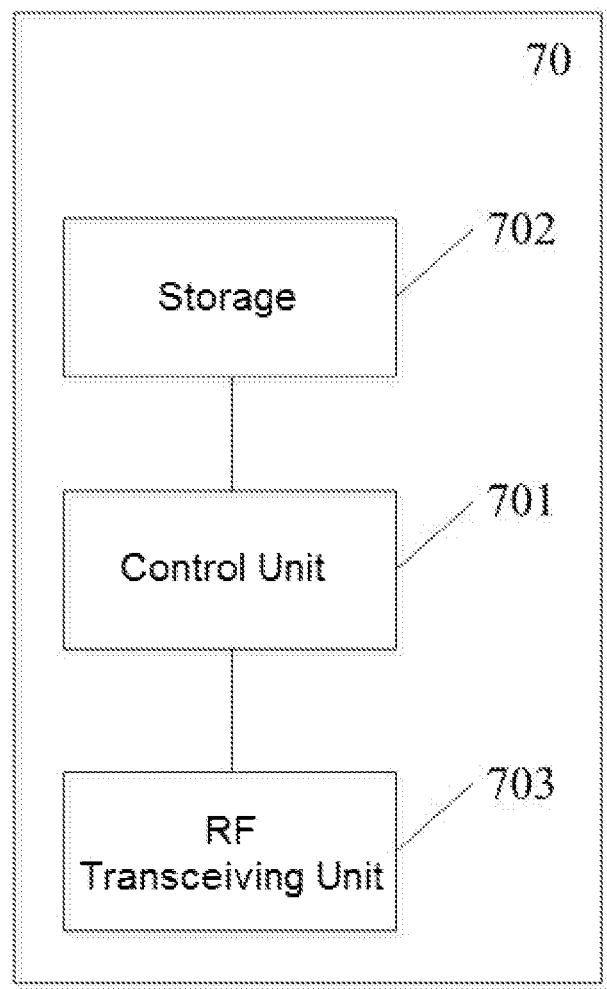
FIG. 7 shows a schematic diagram for the construction of a multi-mode IoT device according to embodiments of the disclosure.

FIG. 7 shows a schematic diagram for the construction of a multi-mode IoT device according to embodiments of the disclosure.

As shown in FIG. 7, one embodiment of the disclosure provides a multi-mode IoT device, including: a control unit 701; a storage 702 including a plurality of first segments, the plurality of first segments respectively having communication mode boot codes for respective communication modes stored therein and containing segment boot flags, wherein each of the segment boot flags is configured to, when set to be valid, indicate that a corresponding segment is a bootable segment, and when set to be invalid, indicate that the corresponding segment is an unbootable segment; and an RF transceiving unit 703 supporting various communication modes; wherein the control unit 701 is configured to: check the segment boot flag in the storage 702 in response to a booting operation for the multi-mode IoT device; and run, when a valid segment boot flag is detected, a communication mode boot code in a first segment corresponding to the valid segment boot flag, to cause the RF transceiving unit 703 to work in a communication mode corresponding to the corresponding first segment.

In certain embodiments, the communication mode includes Bluetooth Low Energy (BLE), BLE Mesh, Zigbee, Thread, HomeKit, ANT and a private communicate protocol.

According to certain embodiments of this disclosure, the storage 702 further includes a second segment for updating the communication mode boot codes, the second segment having a segment boot flag, and the control unit 701 is further configured to: check the segment boot flag of the second segment; and run a communication mode boot code in the second segment if it is detected that the segment boot flag of the second segment is valid, to cause the RF transceiving unit 703 to work in a communication mode corresponding to the second segment.

According to certain embodiments of this disclosure, the control unit 701 is further configured to: download an updated communication mode boot code corresponding to a current communication mode of the RF transceiving unit 703 into the second segment; and set the segment boot flag of the second segment to be valid, and set a segment boot flag of a first segment corresponding to the current communication mode to be invalid.

According to certain embodiments of this disclosure, after causing the RF transceiving unit 703 to work in the communication mode corresponding to the second segment, the control unit 701 is further configured to: copy the communication mode boot code in the second segment into a first segment that corresponds to the communication mode corresponding to the second segment; and set the segment boot flag of the second segment to be invalid, and set a segment boot flag in the first segment that corresponds to the communication mode corresponding to the second segment to be valid.

Here, it should be noted that: the description of the above device embodiment is similar to that of the above method embodiment, and the same beneficial effects as the method embodiment can be obtained, thus no repeated description will be given again here. For the technical details not disclosed in the device embodiment of the disclosure, reference may be made to the description of the method embodiment of the disclosure.

Exemplary Device

The method and device according to one exemplary embodiment of the disclosure have been introduced above, and next, a multi-mode IoT device according to another exemplary embodiment of the disclosure will be introduced.

It may be understood by one skilled in the art that, each aspect of the disclosure may be implemented as a system, a method or a program product. Therefore, each aspect of the disclosure may be specifically implemented in the following forms, i.e., full hardware embodiment, full software embodiment (including firmware and microcode, etc.) or an embodiment combining hardware and software aspects, which herewith may be called by the general term of "circuit", "module" or "system".

In some possible embodiments, the multi-mode IoT device according to the disclosure may at least include one or more processors and at least one storage, wherein a computer program is stored on the storage, and when executed by a processor, the computer program causes the processor to implement each step of the booting method for a multi-mode IoT device described in the disclosure, for example, the processor may perform the operations as shown in FIG. 1: Operation 101 of receiving a booting operation for the multi-mode IoT device; Operation 102 of checking at least one of segment boot flags in a storage of the multi-mode IoT device in response to the booting operation, wherein the storage includes a plurality of first segments, the plurality of first segments respectively having communication mode boot codes for respective communication modes stored therein and containing the segment boot flags, wherein each of the segment boot flags is configured to, when set to be valid, indicate that a corresponding segment is a bootable segment, and when set to be invalid indicate that the corresponding segment is an unbootable segment; and Operation 103 of running, when a valid segment boot flag is detected, a communication mode boot code in a first segment corresponding to the valid segment boot flag, to cause the multi-mode IoT device to work in a communication mode corresponding to the first segment.

Figure 8:
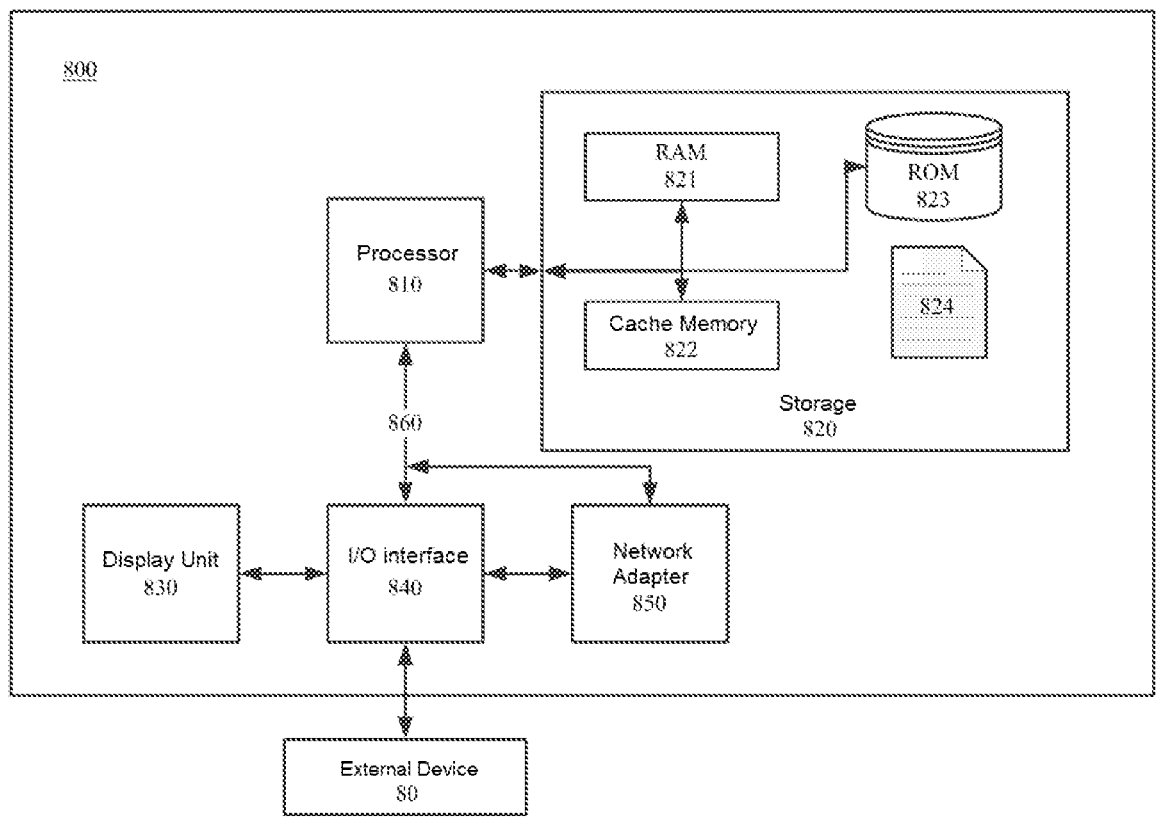
FIG. 8 shows a schematic diagram for the implementation of a multi-mode IoT device according to embodiments of the disclosure.

FIG. 8 shows a schematic diagram for the implementation of a multi-mode IoT device according to embodiments of the disclosure.

The multi-mode IoT device 800 according to the embodiment of the disclosure will be described below referring to FIG. 8. The multi-mode IoT device 800 shown in FIG. 8 is merely an example, without limiting the functions and range of use of the embodiments of the disclosure in any way.

As shown in FIG. 8, the device 800 is shown in the form of a general-purpose computing device, including, but not limited to: at least one processor 810 described above, at least one storage 820 described above, and a bus 860 connecting different system components (including the storage 820 and the processor 810).

The bus 860 includes an address bus, a control bus and a data bus.

The storage 820 may include a volatile storage, for example, a random access memory (RAM) 821 and/or a cache memory 822. The storage 820 may further include a read-only memory (ROM) 823.

The storage 820 may further include a group of (at least one) program module 824, and such a program module 824 includes, but is not limited to: an operating system, one or more application programs, other program modules and program data. Each or a certain combination of such examples may include the implementation of a network environment.

The multi-mode IoT device 800 may further communicate with one or more external devices 80 (for example, a keyboard, a pointing device and a Bluetooth device, etc.). Such communication may be carried out via an input/output (I/O) interface 840 and displayed on a display unit 830. Moreover, the multi-mode IoT device 800 may further communicate with one or more networks (for example, a local area network (LAN), a wide area network (WAN) and/or a public network such as Internet) via a network adapter 850. As shown in the drawing, the network adapter 850 communicates with other modules in the multi-mode IoT device 800 via the bus 860. It should be noted that, although not shown in the drawings, other hardware and/or software modules may be used in conjunction with the multi-mode IoT device 800, including, but not limited to: a microcode, a device driver, a redundant processing unit, an external disk drive array, a RAID system, a magnetic tape drive and a data backup and storage system, etc.

Exemplary Computer Program Product

In some possible embodiments, each aspect of the disclosure may be further implemented in the form of a computer program product, which includes a program code, wherein, when executed by a processor, the program code may be configured to cause the processor to implement each step of the above described method. For example, the processor may perform the operations shown in FIG. 1: Operation 101 of receiving a booting operation for the multi-mode IoT device; Operation 102 of checking at least one of segment boot flags in a storage of the multi-mode IoT device in response to the booting operation, wherein the storage includes a plurality of first segments, the plurality of first segments respectively having communication mode boot codes for respective communication modes stored therein and containing the segment boot flags, wherein each of the segment boot flags is configured to, when set to be valid, indicate that a corresponding segment is a bootable segment, and when set to be invalid, indicate that the corresponding segment is an unbootable segment; and Operation 103 of running, when a valid segment boot flag is detected, a communication mode boot code in a first segment corresponding to the valid segment boot flag, to cause the multi-mode IoT device to work in a communication mode corresponding to the first segment.

The computer program product may employ any combination of one or more readable media. The readable medium may be a readable signal medium or a readable storage medium. For example, the readable storage medium may be, but not limited to, an electrical, magnetic, optical, electromagnetic, infrared or semiconductor system, apparatus or device, or any combination of the above. A more specific example of the readable storage medium (non-exhaustive list) includes: an electrical connection with one or more wires, a portable disk, a hard disk, a random access memory (RAM), a read-only memory (ROM), an erasable programmable read-only memory (EPROM or Flash), an optical fiber, a compact disk-read only memory (CD-ROM), an optical storage device, a magnetic storage device or any appropriate combination of above.

Figure 9:
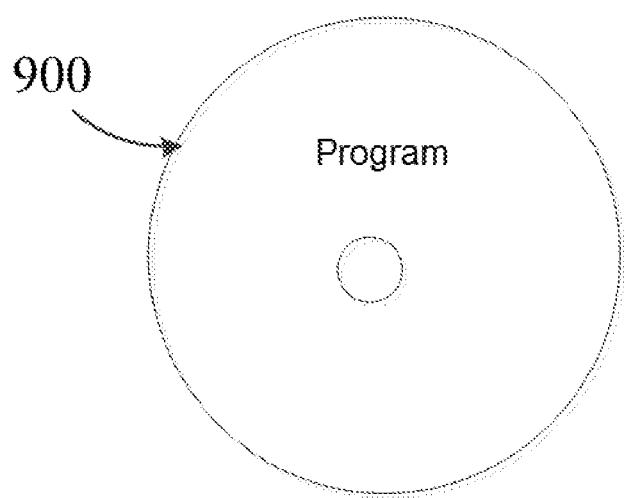
FIG. 9 shows a schematic diagram of a computer-readable storage medium which has a computer program for implementing a booting method for a multi-mode IoT device according to embodiments of the disclosure stored therein.

FIG. 9 is a schematic diagram showing a computer-readable storage medium on which a computer program for implementing a booting method for a multi-mode IoT device according to embodiments of the disclosure is stored.

As shown in FIG. 9, a program product 900 according to embodiments of the disclosure is described, which may employ a compact disk-read only memory (CD-ROM) and include a program code, and may be run on a terminal or a server. However, the program product of the disclosure is not limited hereto. In this document, the readable storage medium may any tangible medium on which a program is contained or stored, wherein the program may be executed by an instruction, or used by a system, an apparatus or a device, or used in conjunction therewith.

The program code for carrying out the operations of the disclosure may be written in any combination of one or more program design languages. The program design language includes an object-oriented program design language such as Java and C++, etc., and it may further include a regular procedural program design language such as C language or similar program design languages. The program code may be fully executed on a user computing device, partially executed on a user device, partially executed on a user computing device, or fully executed on a remote computing device or a server. In a situation concerning a remote computing device, the remote computing device may be connected to the user computing device via any type of networks (including a local area network (LAN) or a wide area network (WAN)), or may be connected to an external computing device (for example, via Internet connection provided by an Internet service provider).

In addition, although the operations of the method of the disclosure have been described in a certain sequence in the drawings, it does not require or indicate that these operations must be carried out in this specific sequence, or the expected result can only be realized by carrying out all the operations shown. Additionally or alternatively, certain steps may be omitted, and a plurality of steps may be combined into one step, and/or one step may be decomposed into a plurality of steps.

It should be noted that, although several apparatuses and subapparatuses configured for software testing are mentioned in the above detailed description, such a segment is not compulsory. In fact, according to the embodiments of the disclosure, the characteristics and functions of two or more apparatuses described above may be embodied in one apparatus. On the contrary, the characteristic and function of one apparatus described above may be further segmented as being embodied by a plurality of apparatuses.

Although the concepts and principles of the disclosure have been described referring to several specific embodiments, it should be understood that the disclosure is not limited to the specific embodiments disclosed, and the segment of each aspect does not indicate that the characteristics in such aspects cannot be combined for further benefits; instead, such a segment is merely provided for easy illustration. The disclosure intends to cover various modifications and equivalent arrangements included in the concept and scope of the claims.

What is claimed is:

1. A booting method for a multi-mode IoT device, comprising:

receiving a booting operation for the multi-mode IoT device;

checking at least one of segment boot flags in a storage of the multi-mode IoT device in response to the booting operation, wherein the storage comprises a plurality of first segments, the plurality of first segments respectively having communication mode boot codes for respective communication modes stored therein and containing the segment boot flags, wherein each of the segment boot flags is configured to, when set to be valid, indicate that a corresponding first segment is a bootable segment, and when set to be invalid, indicate that the corresponding first segment is an unbootable segment;

running, when a valid segment boot flag is detected, a communication mode boot code in a first segment corresponding to the valid segment boot flag, to cause the multi-mode IoT device to work in a communication mode corresponding to the first segment.

2. The booting method according to claim 1, wherein the storage further comprises a second segment for updating the communication mode boot codes, the second segment having a segment boot flag, and the method further comprises:
checking the segment boot flag of the second segment; and
running a communication mode boot code in the second segment if it is detected that the segment boot flag of the second segment is valid, to cause the multi-mode IoT device to work in a communication mode corresponding to the second segment.

3. The booting method according to claim 2, further comprising:
downloading into the second segment an updated communication mode boot code corresponding to a current communication mode of the multi-mode IoT device; and
setting the segment boot flag of the second segment to be valid, and setting a segment boot flag of a first segment corresponding to the current communication mode to be invalid.

4. The booting method according to claim 2, wherein after causing the multi-mode IoT device to work in the communication mode corresponding to the second segment, the method further comprises:
copying the communication mode boot code in the second segment into a first segment that corresponds to the communication mode corresponding to the second segment; and
setting the segment boot flag of the second segment to be invalid, and setting a segment boot flag in the first segment that corresponds to the communication mode corresponding to the second segment to be valid.

5. The booting method according to claim 1, wherein the communication mode comprises at least two of: Bluetooth Low Energy (BLE) or BLE Mesh, Zigbee, Thread, Home-Kit, ANT and a private communicate protocol.

6. A multi-mode IoT device, comprising:
a control unit;
a storage comprising a plurality of first segments, wherein the plurality of first segments respectively have communication mode boot codes for respective communication modes stored therein and contain segment boot flags, each of the segment boot flags being configured to, when set to be valid, indicate that a corresponding first segment is a bootable segment, and when set to be invalid, indicate that the corresponding first segment is an unbootable segment; and
an RF transceiving unit supporting various communication modes;
wherein the control unit is configured to:
check at least one of the segment boot flags in the storage in response to a booting operation for the multi-mode IoT device; and
run, when a valid segment boot flag is detected, a communication mode boot code in a first segment corresponding to the valid segment boot flag, to cause the RF transceiving unit to work in a communication mode corresponding to the first segment.

7. The multi-mode IoT device according to claim 6, wherein the storage further comprises a second segment for updating the communication mode boot codes, the second segment having a segment boot flag, and the control unit is further configured to:
check the segment boot flag of the second segment; and
run a communication mode boot code in the second segment if it is detected that the segment boot flag of the second segment is valid, to cause the RF transceiving unit to work in a communication mode corresponding to the second segment.

8. The multi-mode IoT device according to claim 7, wherein the control unit is further configured to:
download into the second segment an updated communication mode boot code corresponding to a current communication mode of the RF transceiving unit; and
set the segment boot flag of the second segment to be valid, and set a segment boot flag of a first segment corresponding to the current communication mode to be invalid.

9. The multi-mode IoT device according to claim 7, wherein after causing the RF transceiving unit to work in the communication mode corresponding to the second segment, the control unit is further configured to:
copy the communication mode boot code in the second segment into a first segment that corresponds to the communication mode corresponding to the second segment; and
set the segment boot flag of the second segment to be invalid, and set a segment boot flag in the first segment that corresponds to the communication mode corresponding to the second segment to be valid.

10. The multi-mode IoT device according to claim 6, wherein the communication mode comprises: Bluetooth Low Energy (BLE) or BLE Mesh, Zigbee, Thread, Home-Kit, ANT and a private communicate protocol.

11. A multi-mode IoT device, comprising:
one or more processors;
a storage; and
a computer program stored in the storage, wherein, when executed by the one or more processors, the computer program causes the one or more processors to implement a booting method according to claim 1.

* * * * *